US012018758B2

(12) United States Patent
Vishwakarma et al.

(10) Patent No.: US 12,018,758 B2
(45) Date of Patent: Jun. 25, 2024

(54) PILOT VALVE ASSEMBLY

(71) Applicant: Eaton Intelligent Power Limited, Dublin (IE)

(72) Inventors: Ashok Kalappa Vishwakarma, Pune (IN); Divya Juneja, New Delhi (IN); Pradeep Biradar, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/065,938

(22) Filed: Dec. 14, 2022

(65) Prior Publication Data

US 2023/0194002 A1 Jun. 22, 2023

(30) Foreign Application Priority Data

Dec. 17, 2021 (IN) .............................. 202111058968

(51) Int. Cl.
| | | |
|---|---|---|
| *F16K 1/36* | (2006.01) | |
| *F16K 25/00* | (2006.01) | |
| *B64F 1/28* | (2006.01) | |

(52) U.S. Cl.
CPC .............. *F16K 1/36* (2013.01); *F16K 25/005* (2013.01); *B64F 1/28* (2013.01); *F16K 2200/30* (2021.08)

(58) Field of Classification Search
CPC ...... F16K 1/126; F16K 35/025; F16K 31/383; F16K 31/1226; F16K 17/168
See application file for complete search history.

(56) References Cited

U.S. PATENT DOCUMENTS

| | | | | |
|---|---|---|---|---|
| 42,693 | A * | 5/1864 | Sewell et al. ............. | F16K 1/36 |
| | | | | 251/358 |
| 2,912,218 | A * | 11/1959 | Stillwagon ............ | F16K 31/602 |
| | | | | D23/244 |
| 3,042,061 | A * | 7/1962 | Dobrikin ............... | B60T 15/041 |
| | | | | 303/56 |
| 3,172,420 | A * | 3/1965 | Brown ................... | B64D 37/20 |
| | | | | 137/219 |
| 4,303,093 | A * | 12/1981 | Swindler ................ | F16K 31/28 |
| | | | | 251/35 |

(Continued)

FOREIGN PATENT DOCUMENTS

| | | |
|---|---|---|
| CN | 2493784 Y | 5/2002 |
| CN | 205806665 U | 12/2016 |

(Continued)

OTHER PUBLICATIONS

Extended European Search Report for Application No. 22214169.9 dated May 22, 2023.

*Primary Examiner* — Umashankar Venkatesan
(74) *Attorney, Agent, or Firm* — Merchant & Gould P.C.

(57) ABSTRACT

The present disclosure relates to an improved pilot valve assembly for a hydrant pit valve. The pilot valve assembly includes a poppet that is movable between an open position and a closed position. The poppet has a molded seal with an interlock feature to hold the seal rigidly. The pilot valve assembly also includes a manually reset mechanism. The reset mechanism can be horizontally positioned and can function to reset the pilot actuator for the next refueling operation. A lanyard can be connected to the poppet to be used a deactuation mechanism.

15 Claims, 15 Drawing Sheets

(56) References Cited

U.S. PATENT DOCUMENTS

| | | | |
|---|---|---|---|
| 7,762,274 B2 * | 7/2010 | Wong | F16K 31/124 |
| | | | 251/291 |
| 8,186,377 B2 * | 5/2012 | Ishitoya | F16K 25/005 |
| | | | 137/516.29 |
| 8,523,144 B2 * | 9/2013 | Pechtold | F16K 1/36 |
| | | | 251/332 |
| 9,273,794 B2 * | 3/2016 | Gregoire | F16K 37/0008 |
| 9,587,757 B2 * | 3/2017 | Johnson | F16K 1/126 |
| 10,203,040 B2 * | 2/2019 | Wong | F16K 15/1826 |
| 10,760,689 B2 * | 9/2020 | Palle | F16K 31/363 |
| 11,079,037 B2 * | 8/2021 | Kunau | F16K 31/383 |
| 2018/0073648 A1 | 3/2018 | Wong | |

FOREIGN PATENT DOCUMENTS

| | | | |
|---|---|---|---|
| CN | 212131314 U | 12/2020 | |
| CN | 214500052 U | 10/2021 | |
| WO | WO-0246651 A1 * | 6/2002 | F16K 17/06 |

* cited by examiner

PILOT VALVE ASSEMBLY

CROSS-REFERENCE TO RELATED APPLICATIONS

This application claims the benefit of Indian Provisional Patent Application No. 202111058968, filed Dec. 17, 2021. The disclosure of the priority application is hereby incorporated herein by reference in its entirety into the present application.

TECHNICAL FIELD

The present disclosure relates generally to hydrant valves or shut-off valves commonly used in aircraft fueling. More particularly, the present disclosure relates to a non-detachable pilot valve actuator.

BACKGROUND

Ground fueling hydrant pit valves are used for fueling aircrafts. The hydrant valves are typically installed in a hydrant pit below ground level to avoid collision with an aircraft or other vehicle. Hydrant valves are designed to deliver fuel by connecting fuel storage through an underground pipeline to an aircraft via a fueling vehicle equipped with a hydrant valve coupler and a hose system. Hydrant valves can be opened or closed by a fueling operator from a distance.

Hydrant valves are not controlled electromechanically due to concerns of fuel igniting. Pressure, either pneumatic or hydraulic, is typically utilized for controlling the opening and closing of hydrant valves. A quick disconnect pressure fitting can be used to apply the pneumatic or hydraulic pressure to the actuator. Due to the high pressure and flow rates sustained by hydrant valves, most hydrant valves are pilot operated. That is, the main hydrant valve can be opened or closed by actuating a smaller pilot valve installed in the main hydrant valve.

There is a need for a more improved pilot actuator assembly to enhance overall performance that results in less seal failure, contamination, and debris accumulation.

SUMMARY

The present disclosure relates to an improved pilot valve assembly for a hydrant pit valve. The pilot valve assembly is designed to block communication between a hydrant chamber and a piston chamber of the hydrant pit valve when a pilot valve of the pilot valve assembly is in a closed position. When air pressure is supplied, the pilot valve assembly can open the pilot valve against a biasing force to permit flow of fluid between the hydrant chamber and the piston chamber of the hydrant pit valve.

The pilot valve assembly includes a poppet that is movable between an open position and a closed position. The poppet has a molded seal with an interlock feature to hold the seal rigidly. An advantageous feature of the molded seal is the decreased risk of delamination which results in less contamination and debris accumulation in the pilot valve assembly. The poppet provides a seal when in the closed position.

The pilot valve assembly also includes a manually reset mechanism. The reset mechanism can be horizontally positioned and can function to reset the pilot actuator for the next refueling operation. The horizontal design of the reset mechanism can reduce the overall length of the pilot actuator assembly to help eliminate excessive loads on the pilot valve. The reset mechanism includes a projection that engages the poppet to restrict movement of the poppet when moved to the open position.

A lanyard can be connected to the poppet to be used a deactuation mechanism. When the lanyard is pulled, the poppet can be moved to an open position. A mechanical stop can be provided to restrict movement of the poppet connected to the lanyard. The mechanical stop may help to avoid excessive loading on the reset mechanism.

These and other features and advantages will be apparent from a reading of the following detailed description and a review of the associated drawings. A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The present disclosure relates to an improved pilot valve assembly. The advantageous features of the pilot valve assembly include a manual reset feature that includes a spring-loaded horizontal pin to reset the pilot actuator. The horizontal configuration of the reset mechanism reduces the overall dimensions of the pilot actuator assembly to decrease excessive loads on a pilot valve or valve stem of the assembly.

The pilot actuator assembly also has a new poppet sealing design that includes a molded type seal to help improve sealing performance and prevent contamination and debris accumulation in the pilot actuator assembly.

The pilot actuator assembly further includes a lanyard deactuation mechanism designed such that when pulled, a collar of the pilot actuator assembly defines a mechanical stop to limit movement of the poppet connected to the lanyard.

A typical hydrant pit valve may include three basic parts, a lower valve assembly, an upper valve assembly and a pilot valve.

Figure 1:
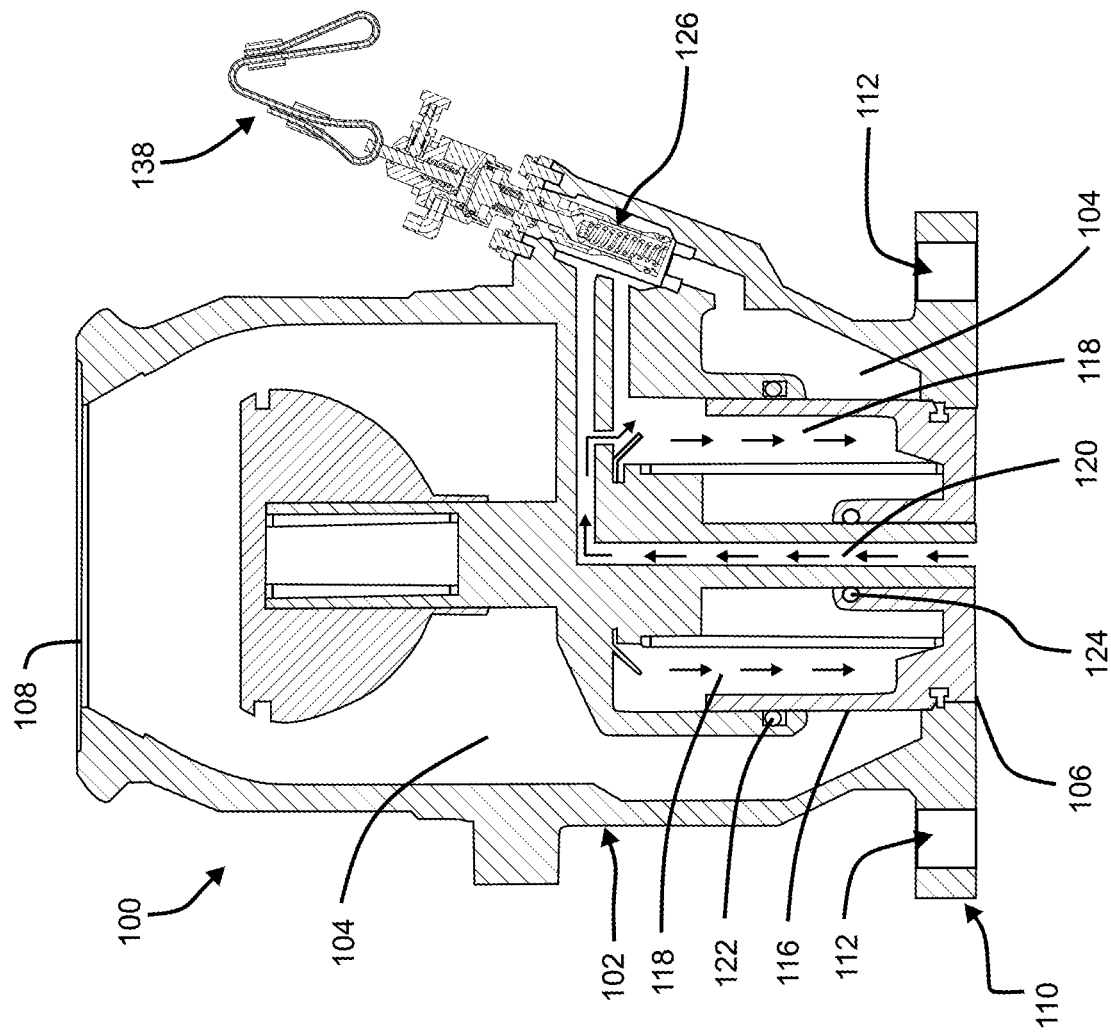
FIG. 1 illustrates a cross-sectional view of an example hydrant pit valve including a Z-pilot valve assembly in accordance with principles of the present disclosure.
Figure 2:
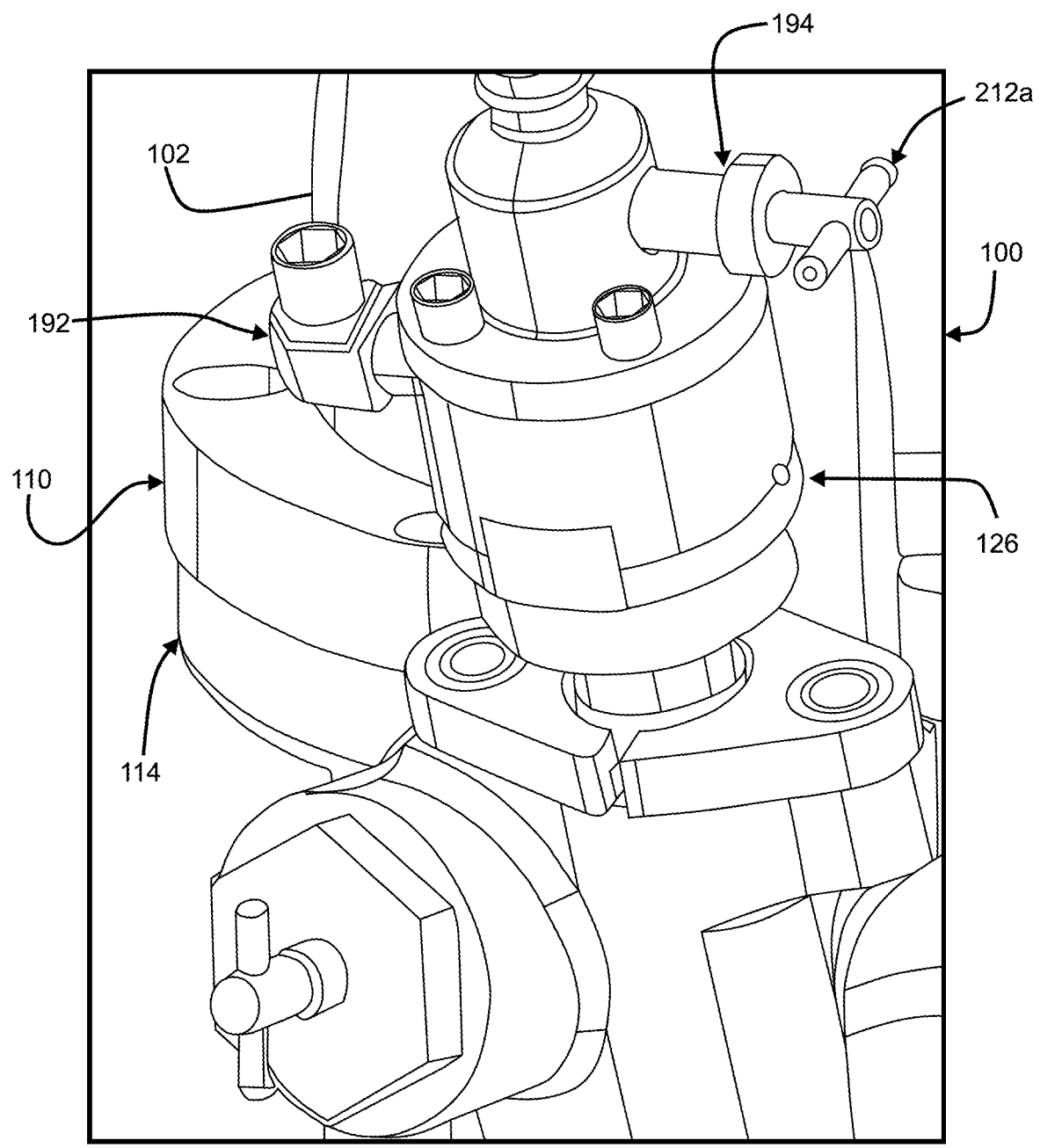
FIGS. 2-3 illustrate schematic views of the hydrant pit valve with the Z-pilot valve assembly of FIG. 1.
Figure 3:
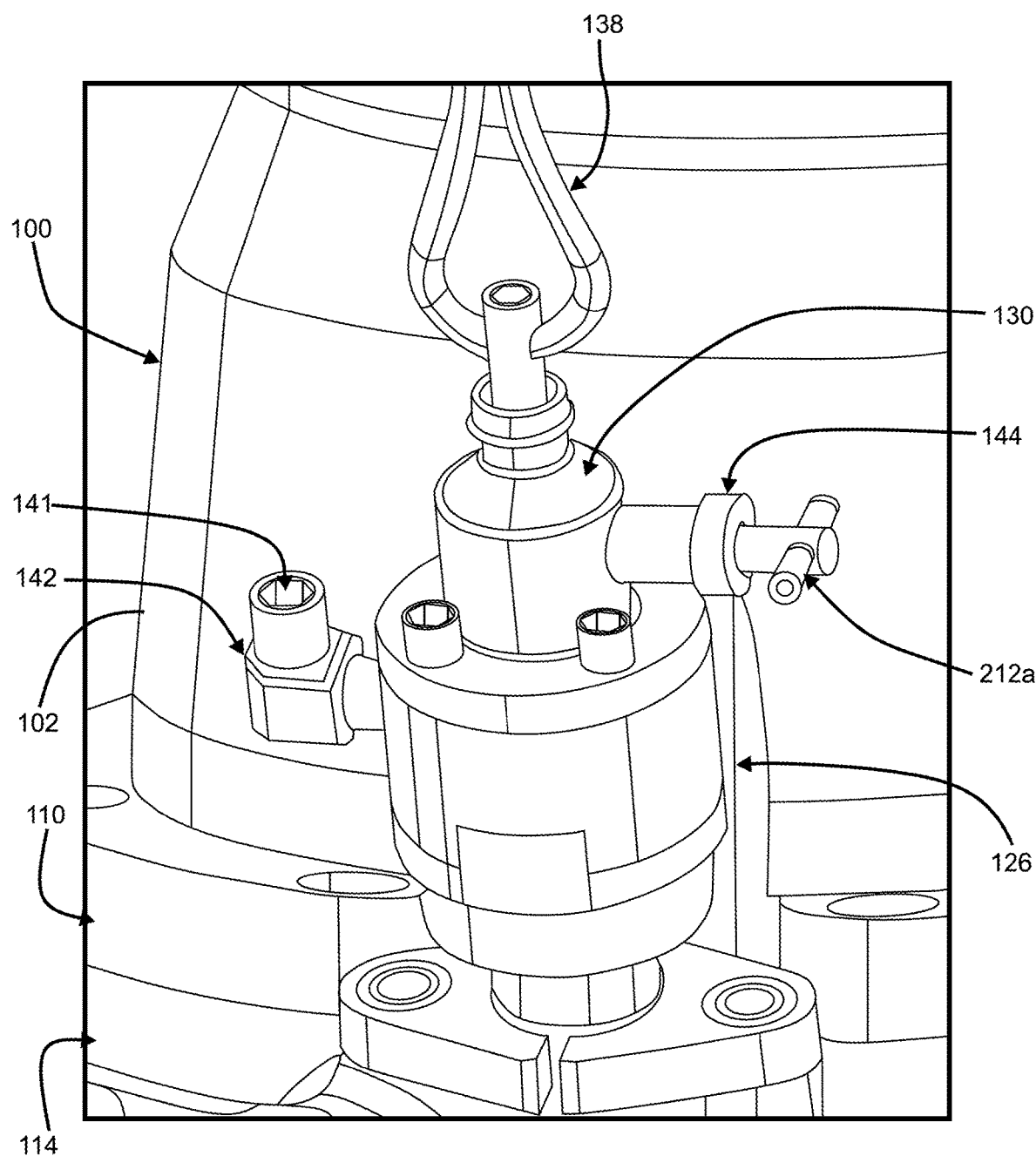

FIG. 1 illustrates an example hydrant pit valve 100 that includes an upper valve assembly or hydrant body 102. The hydrant body 102 defines a hydrant chamber 104 that has an inlet end 106 and an outlet end 108. The hydrant body 102 has a flange 110 that defines openings 112 that can receive fasteners (not shown) for securing the hydrant body 102 to a flange 114 of a lower valve assembly (see FIGS. 2-3) of the hydrant pit valve 100. A fuel supply (not shown) can be supplied to the hydrant chamber 104 through the inlet end 106. A fueling vehicle (not shown) can receive fuel from the hydrant pit valve 100 through the outlet end 108.

The hydrant body 102 may include a piston 116 within the hydrant chamber 104 that is movable between opened and closed positions relative to the inlet end 106. The piston 116 defines a piston chamber 118 that can be in fluid communication with the inlet end 106 through a passageway 120. When the piston 116 is in the closed position, it prevents the flow of fuel through the inlet end 106. The piston chamber 118 can be isolated from the hydrant chamber 104 by seals 122 and 124 and a Z-pilot (i.e., dual pilot) valve 126.

Because the piston chamber 116 can be in communication with the inlet end 106, the pressure within the piston chamber 116 is equalized with the pressure at the inlet end 106. In addition, because the piston chamber 116 can be isolated from the hydrant chamber 104, the pressure in the hydrant chamber 104 is negligible. The piston 114 can remain in the closed position because of the equalized pressure exerted in the piston chamber 116 and the opposing pressure exerted at the inlet end 106 (see arrows).

Figure 4:
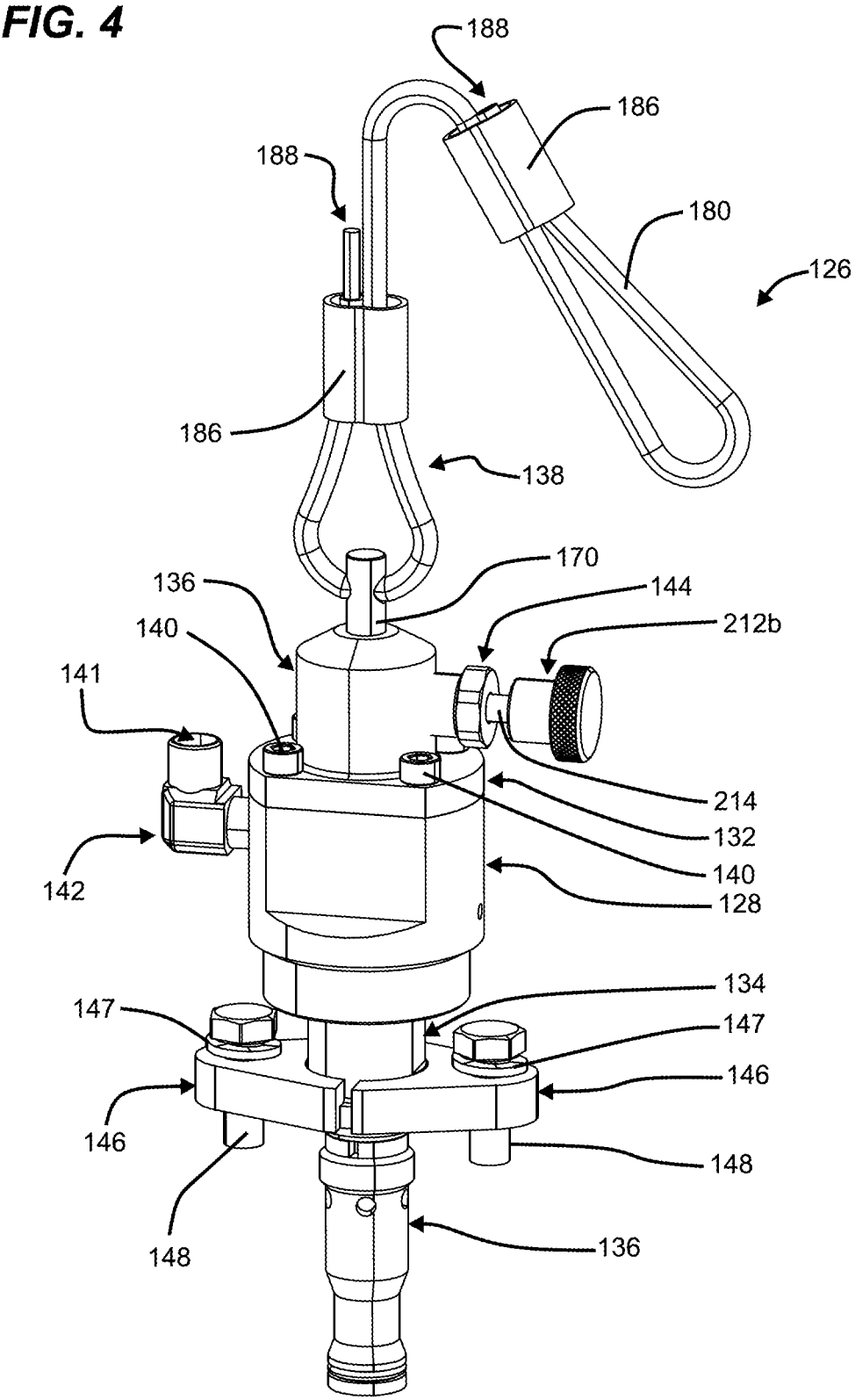
FIG. 4 illustrates a perspective view of the Z-pilot valve assembly of FIG. 1.
Figure 5:
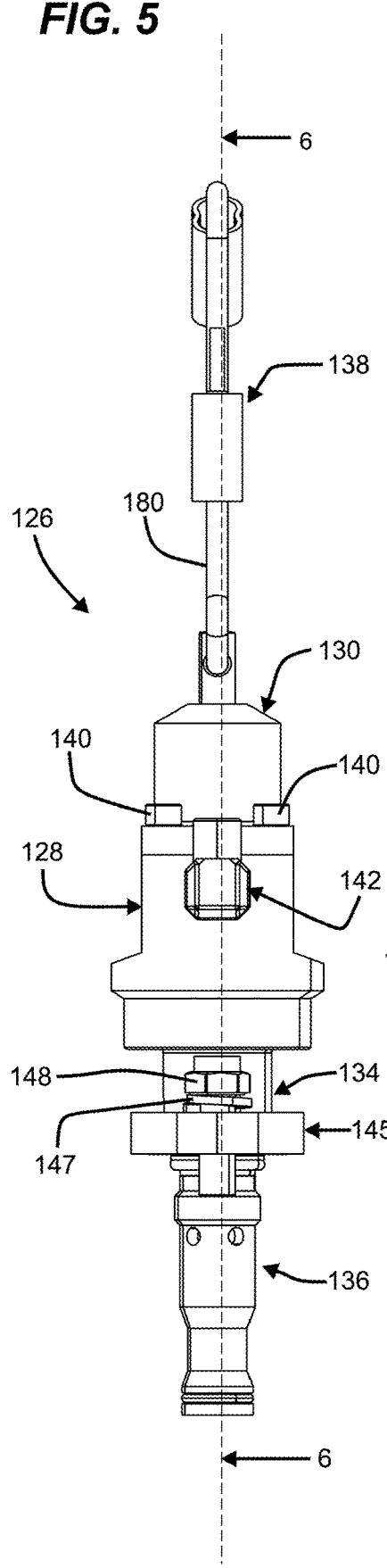
FIG. 5 illustrates a side view of the Z-pilot valve assembly of FIG. 4.
Figure 6:
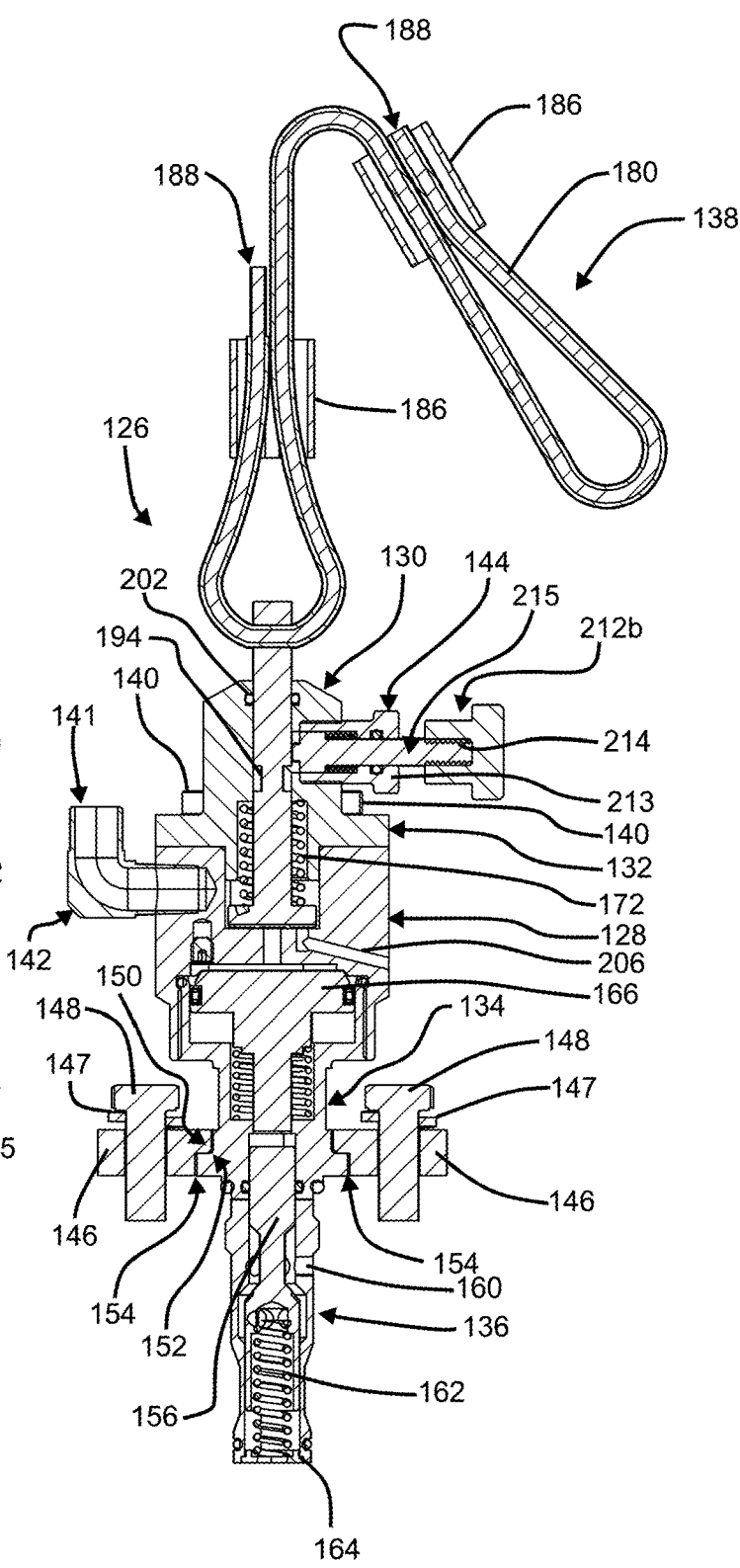
FIG. 6 is a cross-sectional view taken along line 6-6 of FIG. 5 showing a pilot valve and piston actuator in accordance with the principles of the present disclosure.

Turning to FIGS. 4-6, multiple views of the Z-pilot valve assembly assembly 126 are depicted. The Z-pilot valve assembly 126 includes a connector body 128, a collar 130 with a connector flange 132, an actuator body 134, a pilot valve 136 and a lanyard 138. The collar 130 can be mechanically attached to a distal end 125 (see FIG. 11) of the connector body 128 via the connector flange 132 using fasteners 140. A mating portion 133 (see FIG. 11) of the actuator body 134 can be mounted to the connector body 128 at a proximal end 127 (see FIG. 11) of the connector body 128. In certain examples, the actuator body 134 and the connector body 128 are formed together as one single piece, although alternatives are possible.

A pressure supply adapter 142 in the form of an elbow can be provided on the connector body 128 to connect a source of pressure medium, i.e., pneumatic, or hydraulic fluid. During normal operation, a minimum of 35 psi air pressure can be supplied through an inlet 141 of the pressure supply adapter 142. The Z-pilot valve assembly 126 can also include a reset mechanism 144 (e.g., reset pin) that can be manually operated to reset the system. The reset mechanism 144 may be mounted within an opening 143 (see FIG. 11) defined in the collar 130 of the Z-pilot valve assembly 126.

The Z-pilot valve assembly 126 can be mechanically secured to the hydrant pit valve 100 via one or more mounting plates 146 and fasteners 148 that may optionally include washers 147. In the example depicted, two mating plates 146 are provided, although alternatives are possible. Each one of the mounting plates 146 may have a mating structure 150 configured to mate with a corresponding mating structure 152 on the actuator body 134 to provide a mating interface 154. In certain examples, the mating interface 154 may provide an interference or friction fit connection. In certain examples, the fasteners 148 may be nylon insert bolts to help prevent rotation of the mounting plates 146, although alternatives are possible. In some examples, the fasteners 148 include a hex bolt. In other examples, the fasteners 148 include socket head cap screws.

Figure 7:
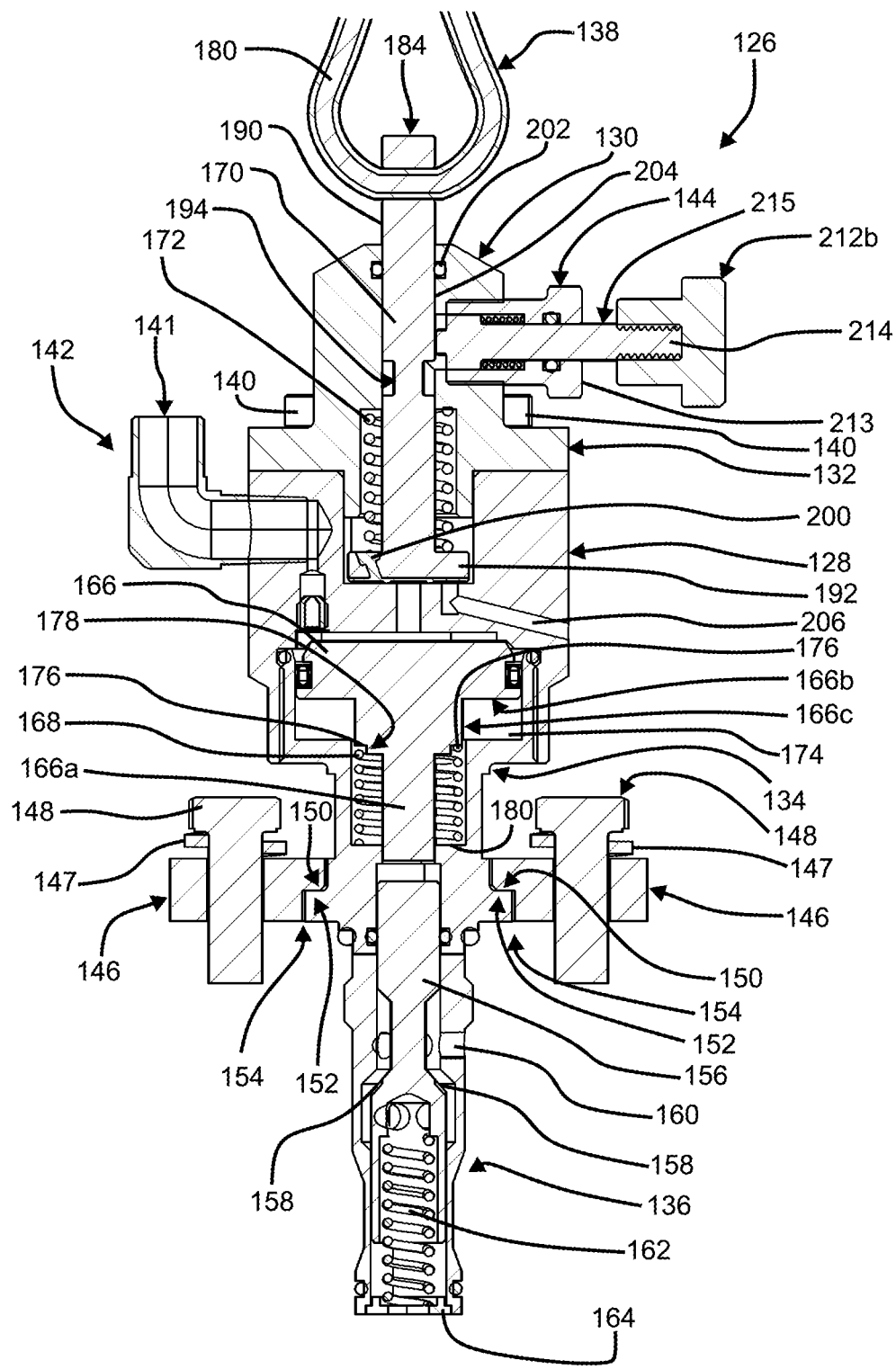
FIG. 7 is a plan view of the Z-pilot valve assembly of FIG. 6.

Turning to FIG. 7, the pilot valve 136 can be disposed between the hydrant chamber 104 and the piston chamber 118 thereby blocking communication between the two chambers when the pilot valve 136 is in a closed position. The pilot valve 136 includes a pilot valve stem 156, a pilot valve seat 158, a pilot valve opening(s) 160 adjacent the pilot valve seat 158, a pilot valve return spring 162, and a pilot valve spring retainer 164. The pilot valve return spring 162 biases the pilot valve stem 156 in a closed position against the pilot valve seat 158. When the pilot valve stem 156 is positioned against the pilot valve seat 158, fluid flow through the pilot valve opening(s) 160 can be obstructed. When the pilot valve stem 156 is moved away from the pilot valve seat 158, the pilot valve 136 can move into an open position permitting the flow of fuel from the piston chamber 118 to the hydrant chamber 104 through the pilot valve opening(s) 160.

The Z-pilot valve assembly 126 further includes a piston actuator 166 and a piston actuator return spring 168 housed within the actuator body 134. The Z-pilot valve assembly 126 also includes a spring-loaded actuator poppet 170 (e.g., plunger) and an actuator poppet spring 172. The piston actuator 166 is a non-detachable actuator (i.e., will remain secured to a pit valve). The piston actuator 166 can be sealed to prevent the transfer of pressure medium from the piston actuator 166 to the pilot valve 136. The piston actuator 166 may have a generally T-shaped cross-section, although other shapes are possible that provide the same functions and results.

The piston actuator 166 has a rod section 166a and a t-shaped section 166b that extends from two sides of the rod section 166a. A neck section 166c of the piston actuator 166 generally extends between the t-shaped section 166b and the rod section 166c. The piston actuator return spring 168 is coiled about the rod section 166a of the piston actuator 166.

The actuator body 134 defines a cavity 174 that generally has a corresponding cross-sectional t-shape to receive the piston actuator 166. Spring stops 176 are defined at a step portion 178 of the neck section 166c and at a closed bottom 180 of the cavity 174. The piston actuator 166 is movable between an extended or open position (see FIG. 9) and a retracted or closed position (see FIG. 7) within the cavity 174 of the actuator body 134. The piston actuator return spring 168 is configured to bias the piston actuator 166 in the retracted or closed position. That is, in the absence of a pressure supply, the piston actuator return spring 168 biases the piston actuator 166 in a closed position.

Figures 8, 9, 10:
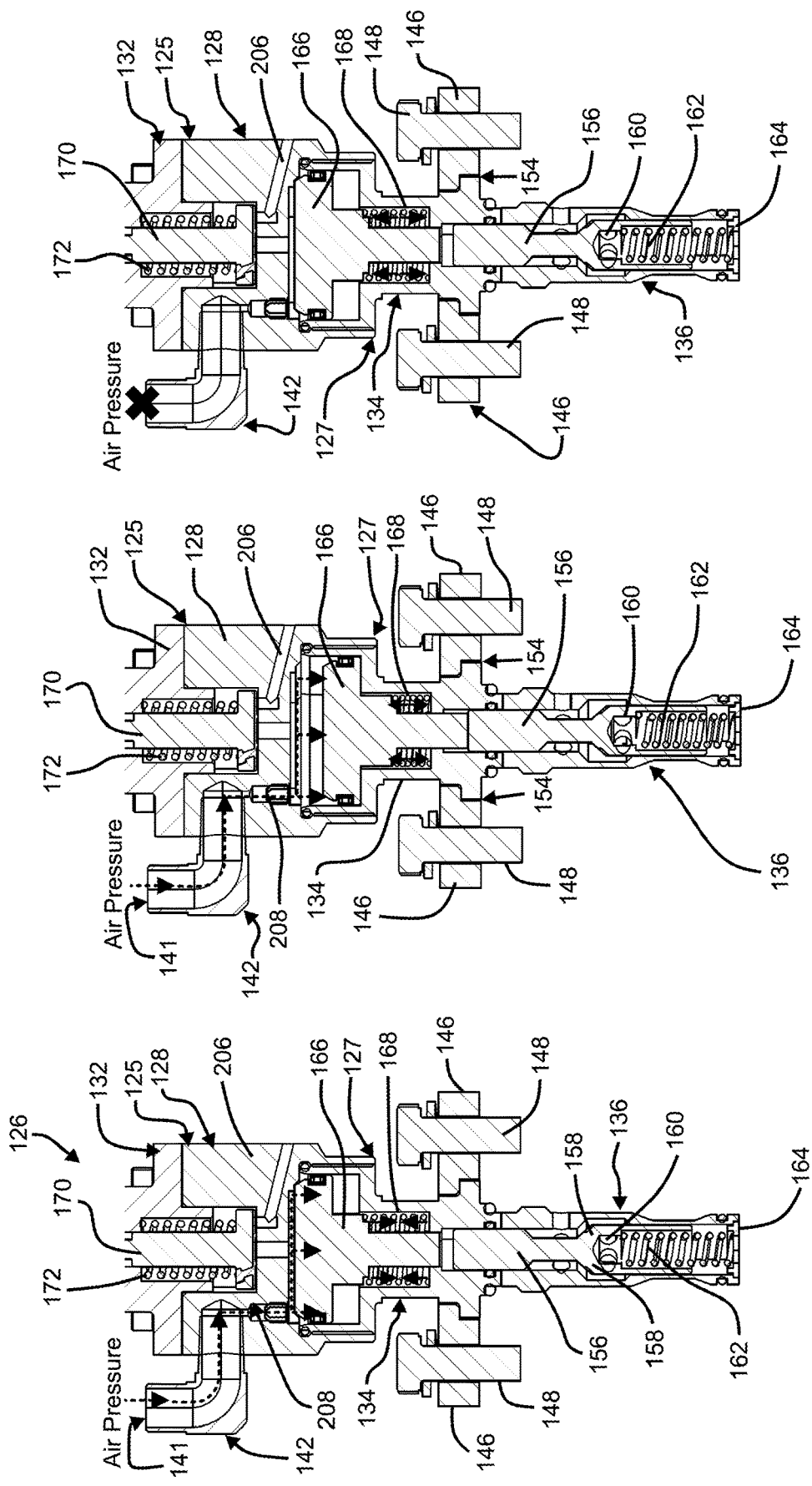
FIGS. 8-10 illustrate the actuation and deactuation process of the Z-pilot valve assembly in accordance with the principles of the present disclosure.

FIGS. 8-10 illustrate a process of introducing a pressure medium through the pressure supply adapter 142. When the pressure medium is introduced, a force can be exerted on the piston actuator 166 to move the piston actuator 166 to an extended or open position (see FIG. 9) against the biasing force of the piston actuator return spring 168. When the piston actuator 166 is in the extended position, it engages the pilot valve stem 156 thereby moving the pilot valve 136 into an open position. That is, the piston actuator 166 provides actuating force to the pilot valve stem 156 to open the pilot valve stem 156 and move the pilot valve stem 156 away from the pilot valve seat 158 permitting the flow of fuel from the piston chamber 116 to the hydrant chamber 104 through the pilot valve opening(s) 160. In this way, fuel is permitted to move from the inlet end 106 through the hydrant chamber 104 to the outlet end 108. When the pressure medium is not supplied, as depicted in FIG. 10, the piston actuator return spring 168 will bring the piston actuator 166 back to its original position to close the pilot valve stem 156 and the pilot valve return spring 162 again biases the pilot valve stem 156 against the pilot valve seat 158 closing the pilot valve 136 and the hydrant pit valve 100.

FIGS. 11-14 will be used to describe the deactuation mechanism of the Z-pilot valve assembly 126.

Figure 20:
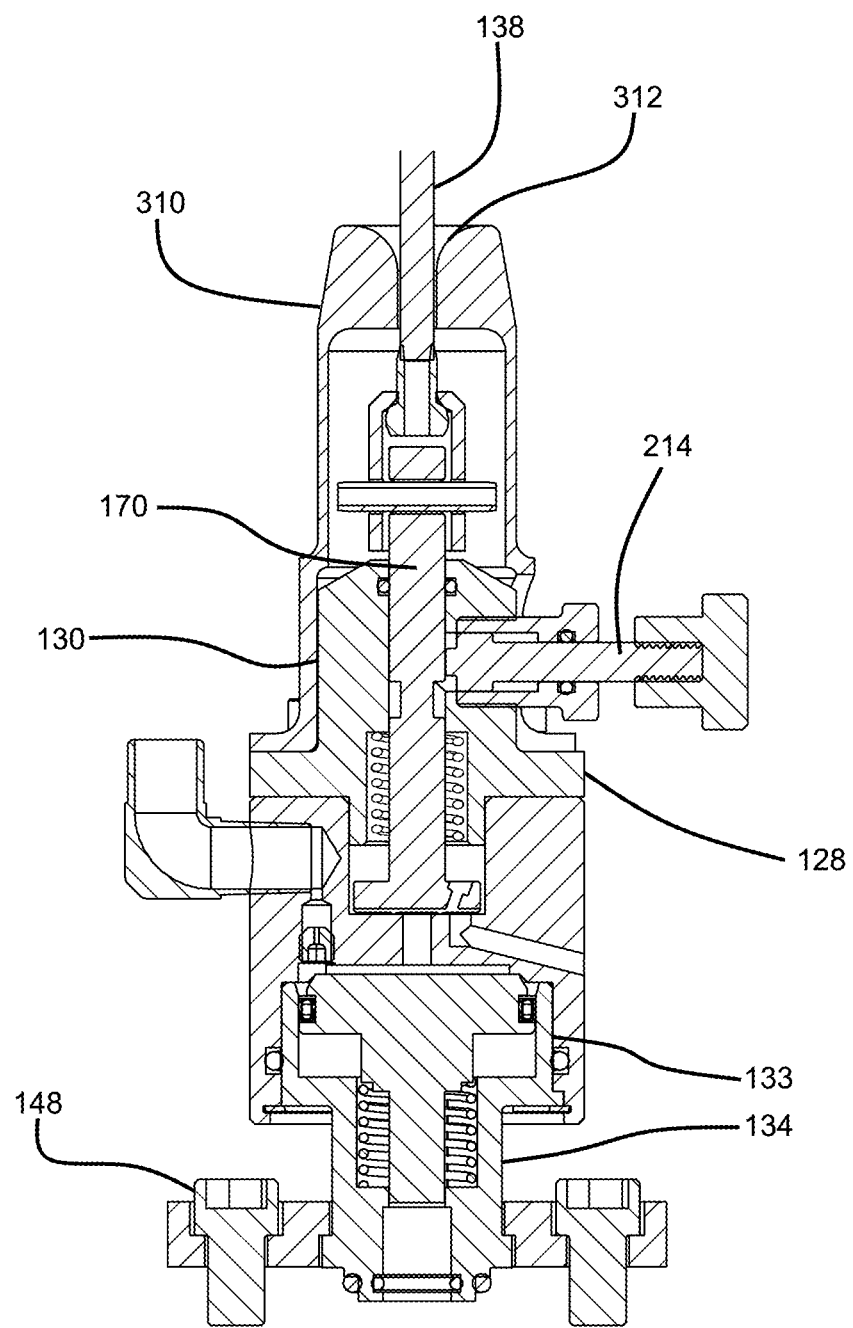
FIG. 20 is a cross-sectional view of the Z-pilot valve assembly with a cover mounted over the securement end of the lanyard.
Figure 21:
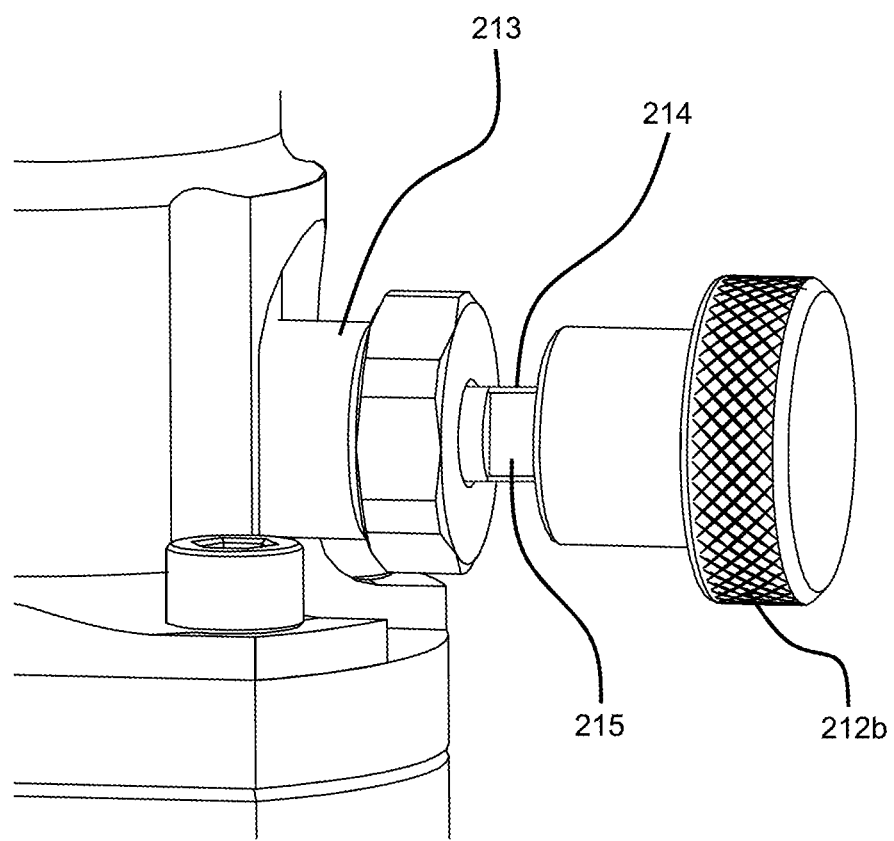
FIG. 21 shows a reset pin suitable for use with the Z-pilot valve assembly, the reset pin having one or more flat surfaces.

The lanyard 138 includes a cable 180 that can be looped through an opening 182 defined in the spring-loaded actuator poppet 170 adjacent a distal end 184 thereof. Sleeves 186 can be used to secure ends 188 of the cable 180 by a crimping method, although alternatives are possible. As shown in FIG. 20, a cover 310 can be mounted to the connector 128 to cover the secured ends 188 of the cable 180. In certain implementations, the cover 310 extends over all or a portion of the collar 130. In certain examples, the cover 310 can be fastened or otherwise secured to the connector body 128 through the collar 130. The cover 310 defines a guide surface 312 along which the cable 180 extends out of the cover 310. In certain examples, the guide surface 312 has a funnel or trumpet shape.

The spring-loaded actuator poppet 170 includes a main body portion 190, a head portion 192 and a recess 194 (e.g., cutout) defined in the main body portion 190. The spring-loaded actuator poppet 170 can be formed from a mold and include a plurality of holes 196 in the head portion 192. The main body portion 190 and the head portion 192 can be formed as one-piece, single body.

An end face 198 of the head portion 192 of the spring-loaded actuator poppet 170 can be provided with a seal member 200 and the seal member 200 can also be disposed within the holes 196 of the head portion 192. The advantageous feature of having the seal member 200 formed in the holes 196 of the head portion 192 is to add structural integrity to eliminate the risk of delamination of the seal member 200 from the end face 198. That is, the seal member 200 in the holes 196 provides an interlock feature to hold the seal rigidly to eliminate delamination from the end face 198 of the head portion 192.

An O-ring 202 can be used to seal the spring-loaded actuator poppet 170 from an opposite top side. The O-ring 202 can help to prevent dust, debris, and/or water from entering into a sliding location 204 defined in the collar 130 where the spring-loaded actuator poppet 170 is slidably movable and/or into the connector body 128.

Actuating pressure can be vented through a vent hole 206 defined in the connector body 128. In the example depicted, the vent hole 204 is configured to help avoid accumulation of dust, water and/or debris. The vent hole 206 and the inlet 141 are both sealed by the seal member 200 of the spring-loaded actuator poppet 170.

Figure 15:
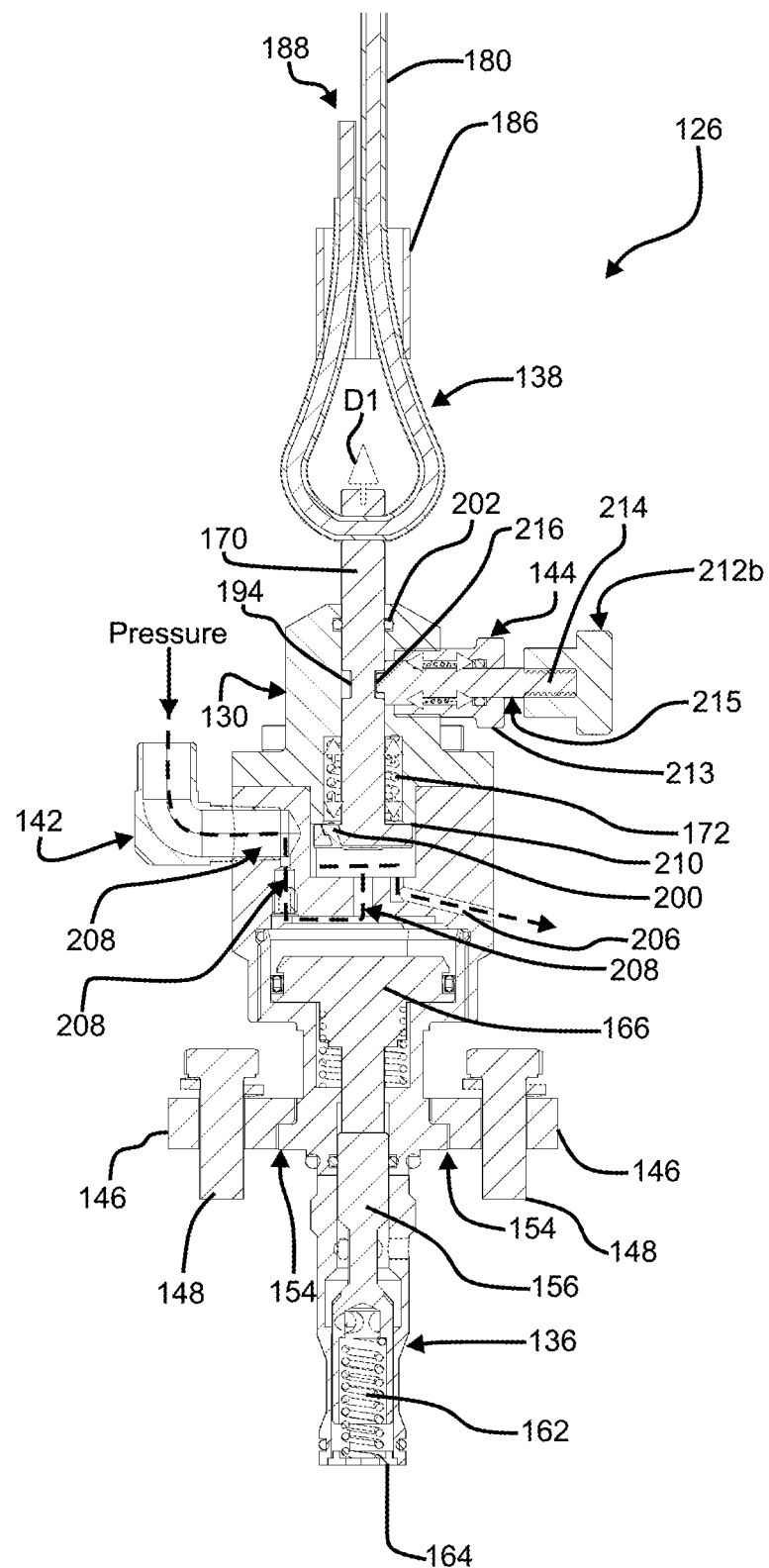
FIG. 15 illustrates a cross-sectional view of the Z-pilot valve assembly where the lanyard has been pulled to bias the spring-loaded actuator poppet to an open position to move the reset mechanism in a second position.
Figure 16:
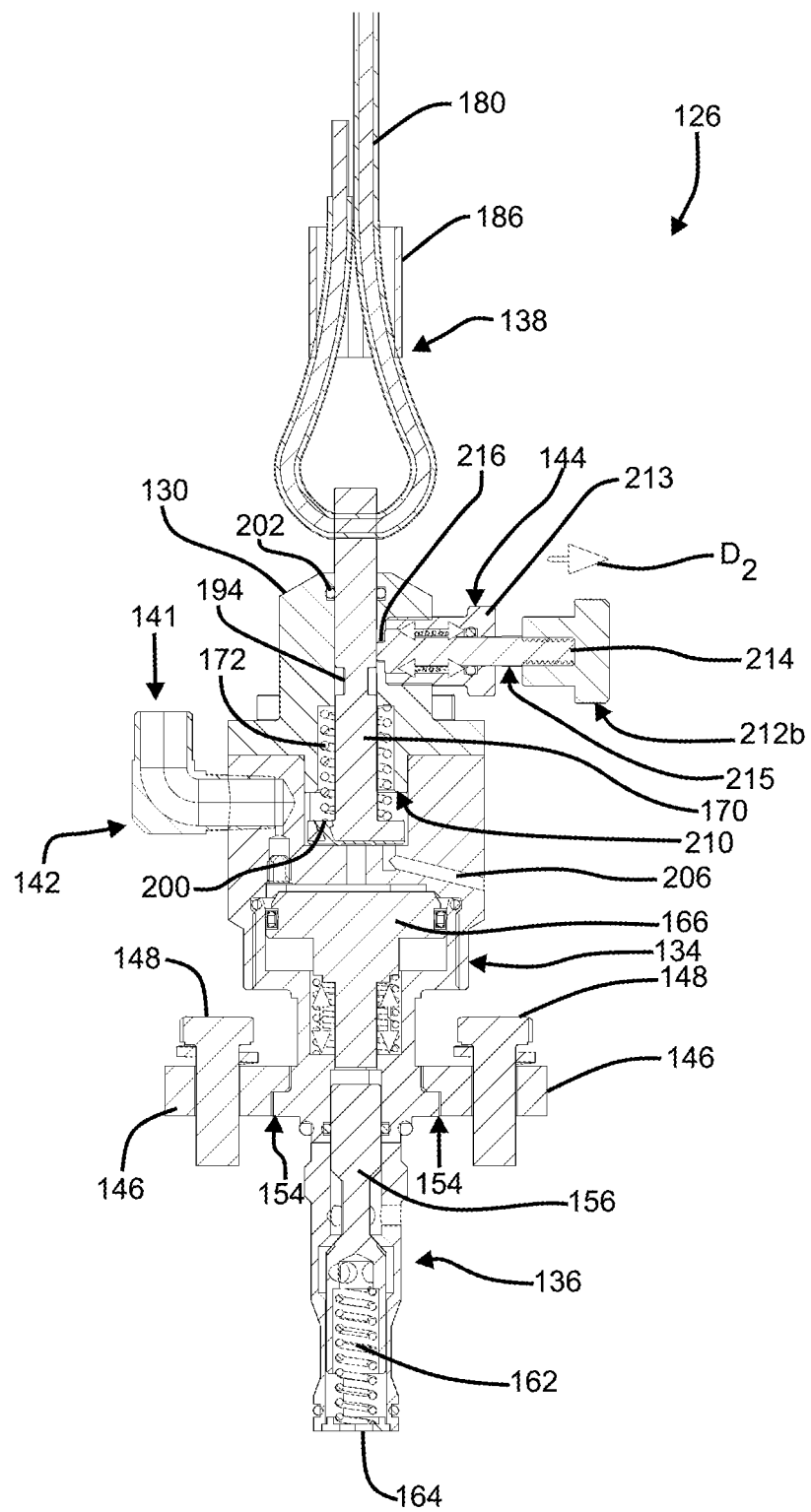
FIG. 16 illustrates a cross-sectional view of the Z-pilot valve assembly with the spring-loaded actuator poppet in a closed position and the reset mechanism in the first position.

Turning to FIGS. 15-16, the lanyard 138 is designed to provide a deactuation mechanism in case of emergency. When the lanyard 138 is pulled in the first direction $D_1$, the spring-loaded actuator poppet 170 is lifted to bias against the actuator poppet spring 172 allowing air pressure to pass through connector body flow passages 208 and vent through the vent hole 204 out into the atmosphere such that the hydrant pit valve 100 closes.

The collar 130 has a mechanical stop 210 that limits the range of motion of the spring-loaded actuator poppet 170 when lifted by the lanyard 138. The spring-loaded actuator poppet 170 can be pulled by the lanyard 138 until the reset mechanism 144 engages the recess 194 of the spring-loaded actuator poppet 170.

The reset mechanism 144 may include a split pin 212a or knob 212b that is attached to a rest pin 214. In certain examples, the split pin 212 can be attached to the reset pin 214 via an opening of the reset pin 214. In certain examples, the knob 212b may be threadedly attached (see 214a) to the reset pin 214. In the example depicted, the reset pin 214 is configured in a horizontal position, which is advantageous in reducing the overall length of the Z-pilot valve assembly 126. As such, excessive loads on the pilot valve stem 156 can be reduced.

Figure 11:
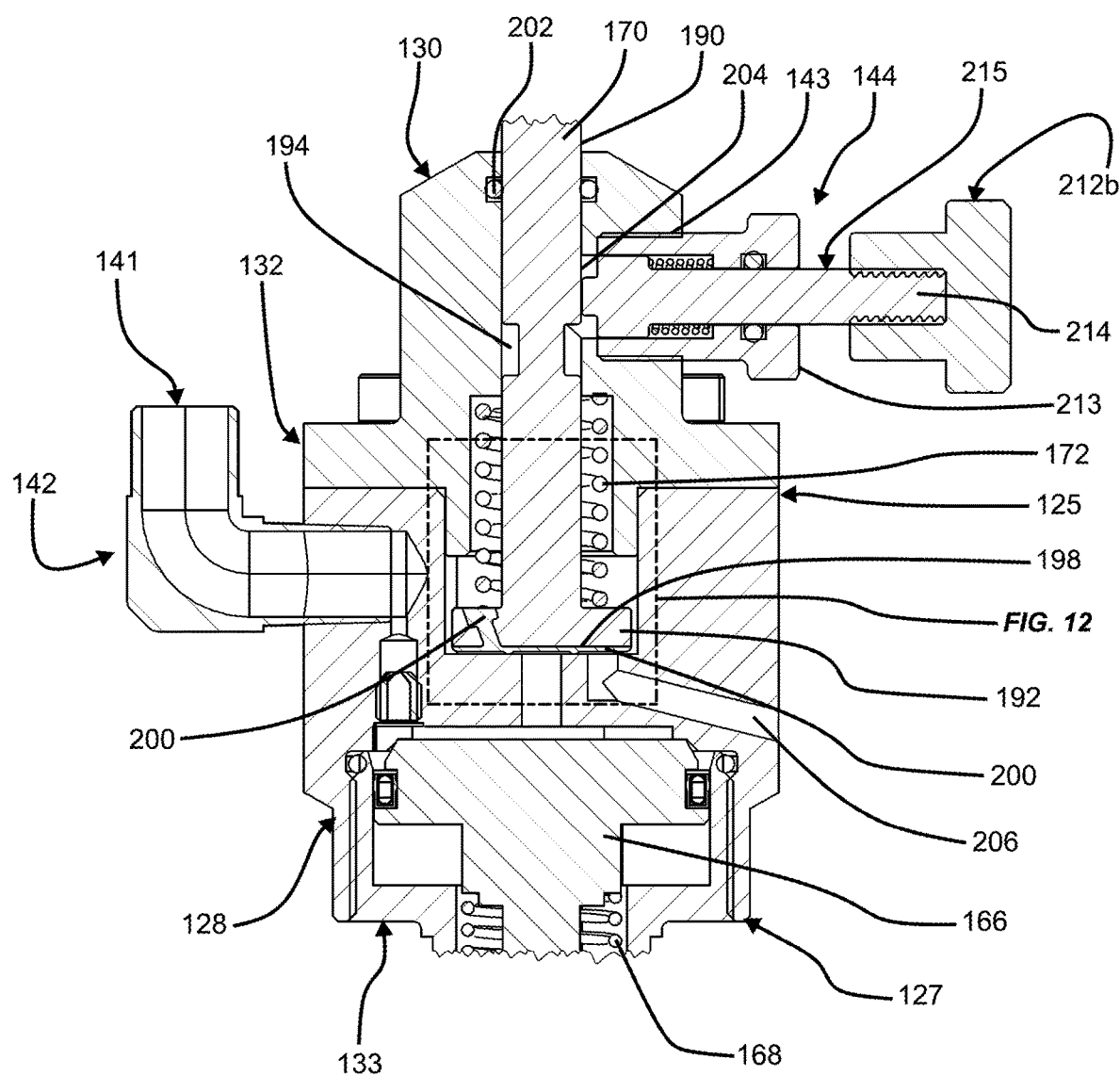
FIG. 11 illustrates an enlarged portion of the Z-pilot valve assembly of FIG. 7 with a reset mechanism in a first position.
Figure 12:
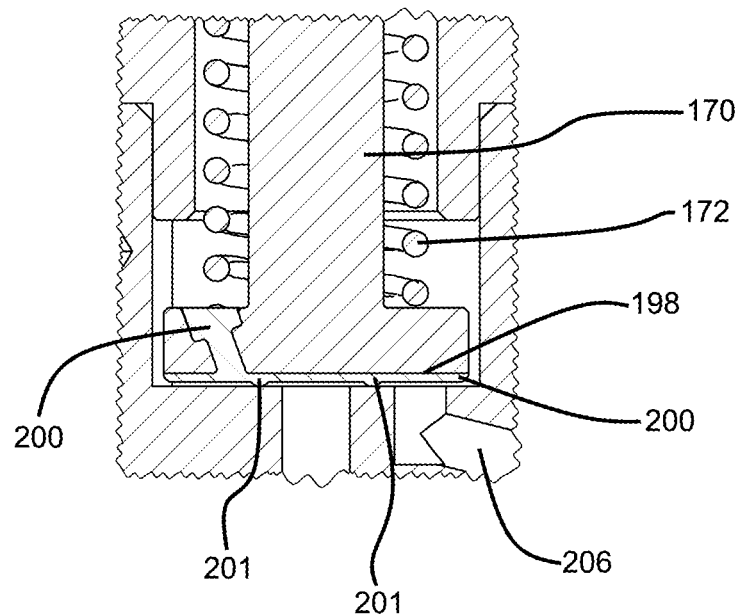
FIG. 12 illustrates an enlarged portion of the Z-pilot valve assembly of FIG. 11.
Figure 13:
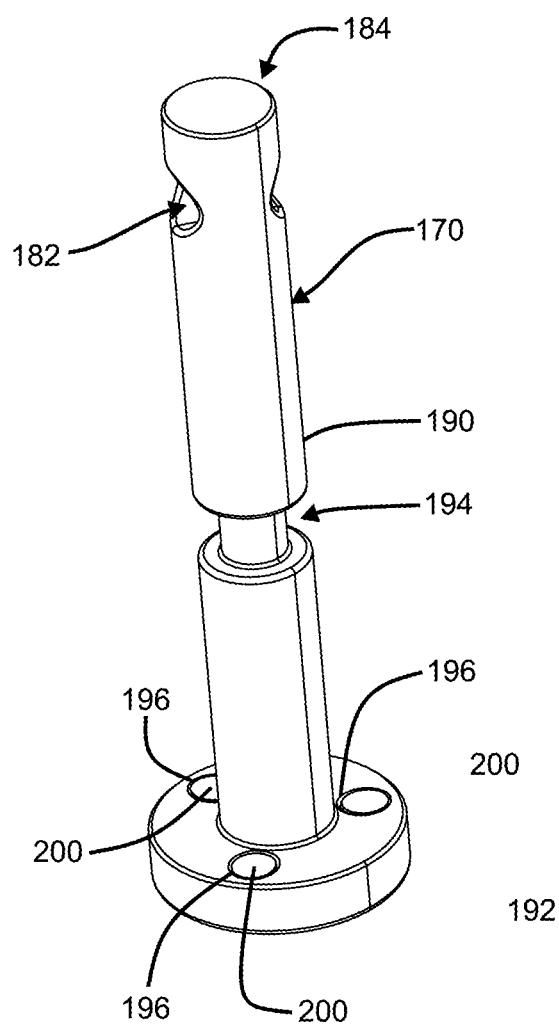
FIG. 13 illustrates a perspective view of a spring-loaded actuator poppet in accordance with the principles of the present disclosure.
Figure 14:
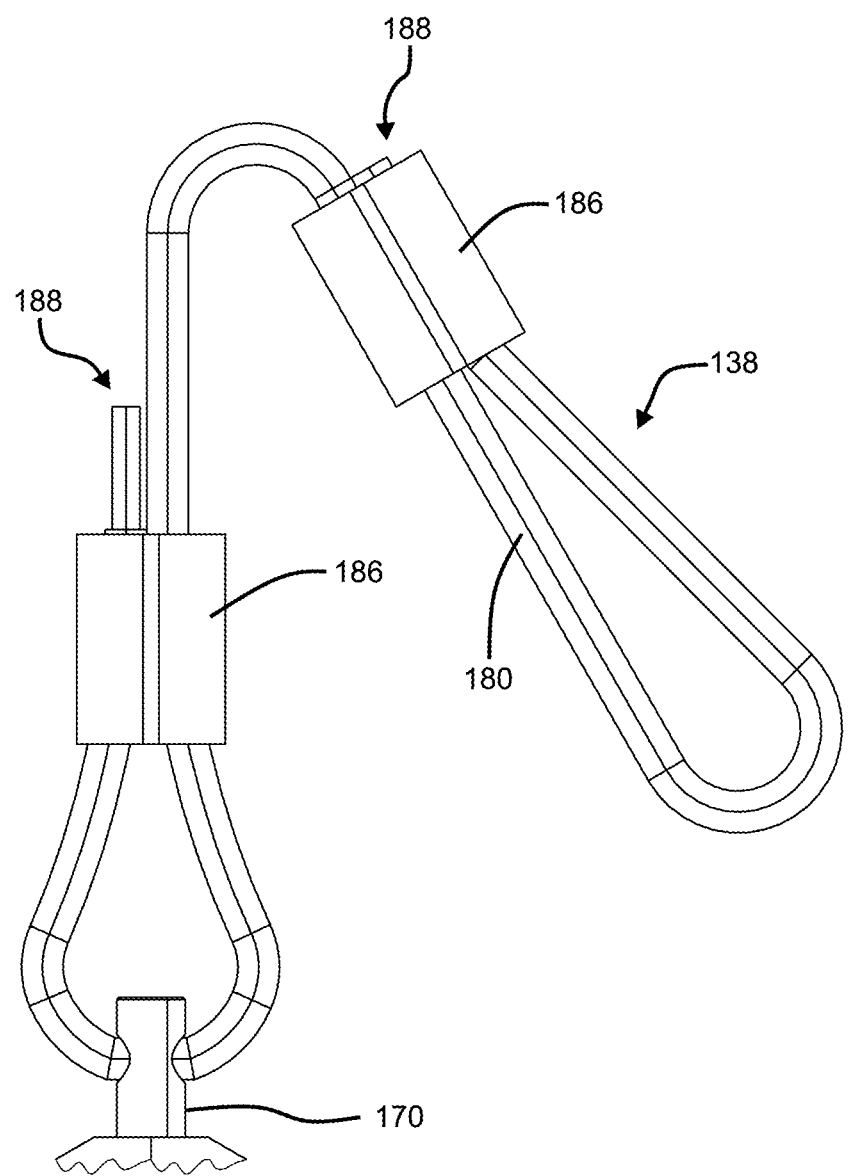
FIG. 14 illustrates a lanyard in accordance with the principles of the present disclosure.

The reset pin 214 can be a spring-loaded pin that is slidably movable within a housing 213 (see FIG. 11). The reset pin 214 includes a projection 216 that engages the spring-loaded actuator poppet. When the spring-loaded actuator poppet 170 is in a closed position thereby creating a seal for the vent hole 204 and the inlet 141, the reset pin 214 is in a first position as shown in FIG. 11 prior to pulling the lanyard 138. The projection 216 of the reset pin 214 can be biased against the main body portion 190 of the spring-loaded actuator poppet 170. When the lanyard 138 is pulled, the spring-loaded actuator poppet 170 can be biased against the actuator poppet spring 172. The spring-loaded actuator poppet 170 can be lifted to allow the projection 216 to pop into the recess 194 of the spring-loaded actuator poppet 170 to restrict the motion of the spring-loaded actuator poppet 170. The reset pin 214 is then locked in the recess 194 in a second position (see FIG. 15) until the reset mechanism 144 is reset. The head portion 192 can engage the mechanical stop 210 of the collar 130 to avoid adding excessive loading on the pin 214 when the lanyard 138 is pulled. Lack of air pressure on the pilot valve 136 can bias the piston actuator 166 against spring load to its retracted or closed position which closes the hydrant pit valve 100.

Turning to FIG. 16, the split pin 212a or knob 212b can be used to manually reset operation of the Z-pilot valve assembly 126. For example, the split pin 212a can be used to manually pull the reset pin 214 of the reset mechanism 144 in a second direction $D_2$—to ready for its next use. The projection 216 of the reset pin 214 can be removed from the recess 194 to release the spring-loaded actuator poppet 170 which is allowed to close due to a spring load. The spring-loaded actuator poppet 170 seals and closes the vent hole 204 to allow for the next refueling operation.

In some examples, the reset pin 214 has a cylindrical shape. In other examples, the reset pin 214 has one or more radially outwardly-facing flat surfaces 215. In certain examples, the reset pin 214 defines two oppositely facing flat surfaces 215. The one or more flat surfaces 215 enhance the ability of a tool such as a wrench gripping the reset pin 214 to facilitate assembly or disassembly of the knob 212b.

Figure 19:
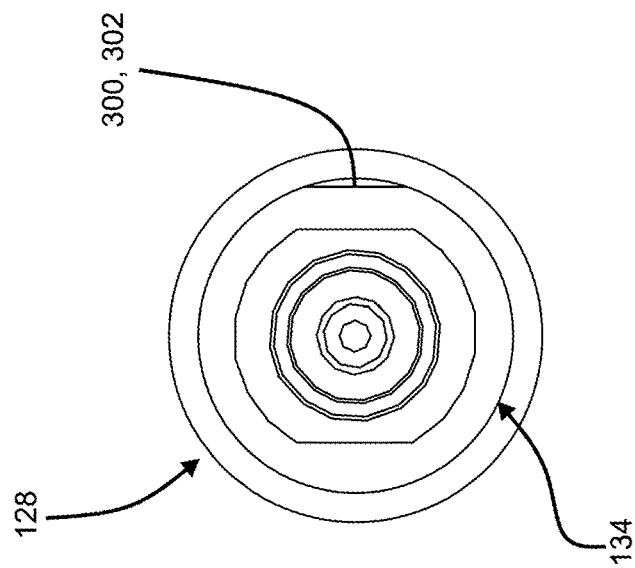
FIG. 19 is a bottom plan view of the actuator body of FIG. 17 mounted to the connector body of FIG. 18.
Figure 18:
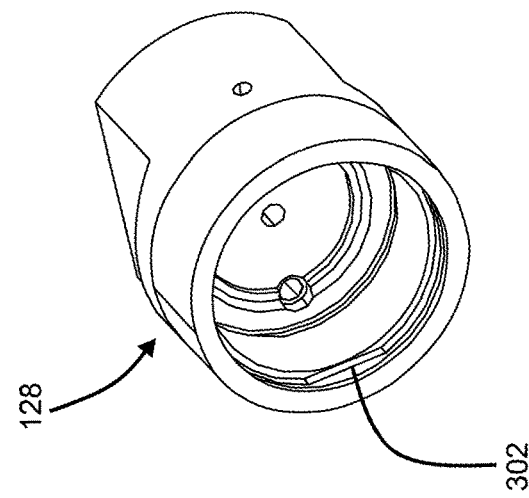
FIG. 18 is a perspective view of a connector body suitable for use with the Z-pilot valve assemblies disclosed herein, the connector body defining an inwardly facing flat edge.
Figure 17:
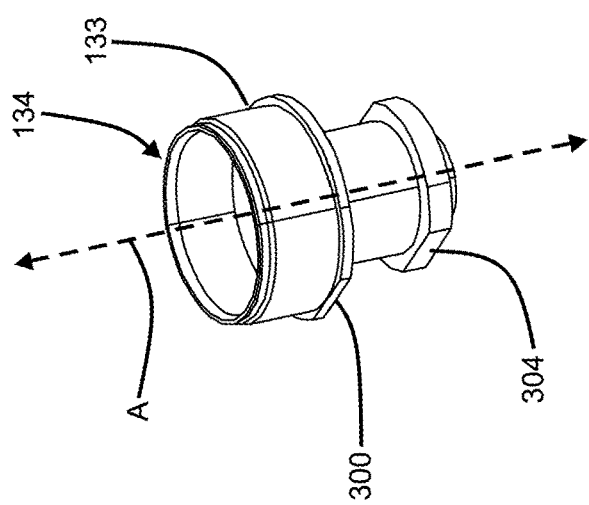
FIG. 17 is a perspective view of an example actuator body suitable for use with the Z-pilot valve assemblies disclosed herein, the actuator body including a flat surfaces to inhibit rotation.

In some implementation, the actuator body 134 is threadably mounted to the connector body 128. In other implementations, however, the actuator body 134 is snap fit, friction fit, or otherwise secured to the connector body 128. Referring to FIGS. 17-19, the actuator body 134 and the connector body 128 are configured to inhibit relative rotation along a longitudinal axis A of the actuator body 134. In certain implementations, the actuator body 134 and connector body 128 each define one or more flat surfaces that abut each other to inhibit rotation.

For example, as shown in FIG. 17, the actuator body 134 (e.g., the mating portion 133 of the actuator body 134) includes a radially outwardly-facing flat surface 300 and the connector body 128 defines a radially inwardly-facing flat surface 302. When the actuator body 134 is mounted at the connector 128, the outwardly-facing flat surface 300 contacts the inwardly-facing flat surface 302 to inhibit the actuator body 134 from rotating about the axis A relative to the connector 128. In some examples, the actuator body 134 and connector body 128 include only a single flat surface 300, 302 each so that the actuator body 134 can be mounted at the connector body 128 in only one rotational position. In other examples, however, one or both of the actuator body 134 and the connector body 128 may include multiple flat surfaces to enable mounting in various rotational positions, but to retain in a single rotational position once mounted.

In certain implementations, the actuator body 134 also is configured to inhibit rotation relative to the mounting plate 146. For example, as shown in FIG. 17, the actuator body 134 may include a second set of one or more flat surfaces 304 configured to align with one or more flat surfaces defined by the mounting plate 146. In certain examples, the flat surfaces 304 are spaced from the flat surface 302 along the axis A of the actuator body 134. In certain examples, the flat surfaces 304 are radially spaced from the flat surface 302. In the example shown, the actuator body 134 defines a single flat surface 302 to engage with the connector body 128 and multiple flat surfaces 304 to engage with the mounting plate 146.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A pilot valve assembly for use with a hydrant pit valve, the pilot valve assembly being mounted to the hydrant pit valve, the pilot valve assembly comprising:
    a collar having a main body and a flange portion, the main body defining an opening;
    a connector body having a distal end attached to the collar and a proximal end, the connector body defining a vent hole for venting fluid flow;
    a spring-loaded actuator poppet being movable between a closed position and an open position, the spring-loaded actuator poppet having a body portion slidably movable within the collar and a head portion slidably movable within the connector body, the spring-loaded actuator poppet defining a recess about the body portion;
    a seal member being disposed on an end face of the head portion;
    a lanyard secured to the body portion of the spring-loaded actuator poppet at a securement location to enable pulling of the spring-loaded actuator poppet against a bias of an actuator poppet spring;
    a spring-loaded reset pin mounted within the opening of the collar, the spring-loaded reset pin having a projection configured to engage the recess of the spring-loaded actuator poppet when the spring-loaded actuator poppet is moved to the open position; and
    wherein, when the spring-loaded actuator poppet is in the closed position, the seal member is configured to seal the vent hole.

2. The pilot valve assembly of claim 1, wherein the collar defines a mechanical stop so that when the spring-loaded actuator poppet is in the open position, the head portion of the spring-loaded actuator poppet engages the mechanical stop.

3. The pilot valve assembly of claim 1, wherein movement of the spring-loaded reset pin is transverse to movement of the spring-loaded actuator poppet.

4. The pilot valve assembly of claim 1, wherein the vent hole is slanted relative to movement of the spring-loaded actuator poppet.

5. The pilot valve assembly of claim 1, further comprising:
    a pilot valve including a pilot valve stem and a pilot valve return spring to bias the pilot valve stem in a closed position against a pilot valve seat to block fluid flow in the hydrant pit valve; and
    a piston actuator connected to the pilot valve for opening the pilot valve, the piston actuator being housed within a piston actuator body, the piston actuator being biased to a retracted position by a piston actuator return spring, the piston actuator being moved against the bias of the piston actuator return spring to an extended position when fluid flow is supplied through the connector body, the piston actuator pressing against the pilot valve stem when in the extended position to move the pilot valve to an open position to allow fluid flow through the hydrant pit valve.

6. The pilot valve assembly of claim 5, wherein a first end of the piston actuator body is non-rotatably mounted to the connector body.

7. The pilot valve assembly of claim 6, wherein an opposite second end of the piston actuator body is non-rotatably mounted to one or more mounting plates.

8. The pilot valve assembly of claim 1, wherein the seal member is a molded type seal which is molded on the spring-loaded actuator poppet.

9. The pilot valve assembly of claim 8, wherein the spring-loaded actuator poppet is formed from a metallic material.

10. The pilot valve assembly of claim 9, wherein the metallic material is stainless steel.

11. The pilot valve assembly of claim 1, wherein the end face of the head portion of the spring-loaded actuator poppet defines a plurality of holes; and wherein the seal member is disposed within the holes.

12. The pilot valve assembly of claim 1, wherein the lanyard includes a cable looped through an opening defined in the spring-loaded actuator poppet, wherein ends of the cable are secured with a sleeve by crimping.

13. The pilot valve assembly of claim 1, wherein the spring-loaded reset pin defines outwardly facing flat surfaces.

14. The pilot valve assembly of claim 1, wherein a cover mounts over the collar to enclose the securement location.

15. The pilot valve assembly of claim 14, wherein the cover defines a trumpet shaped passage through which the lanyard extends out of the cover.

\* \* \* \* \*